Oct. 22, 1935.  A. HOFACKER  2,018,064
FOLDING RUNNING BOARD FOR ROAD VEHICLES
Filed March 6, 1935
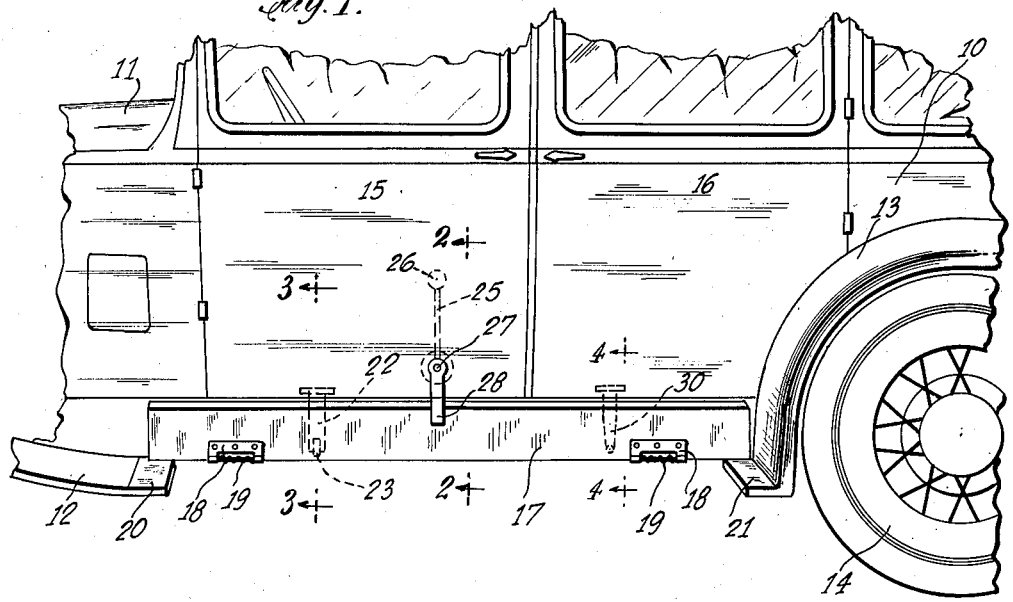
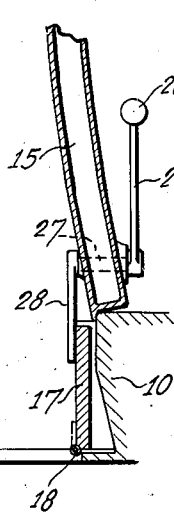
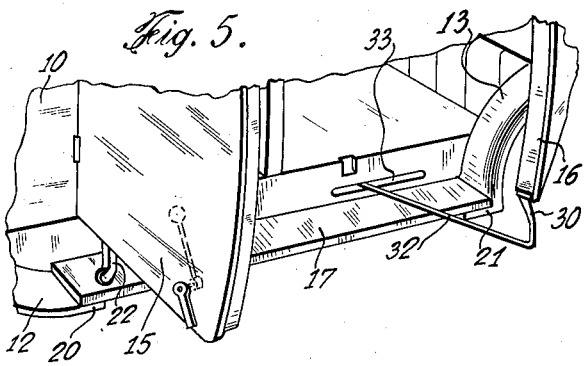
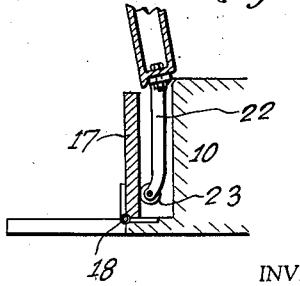
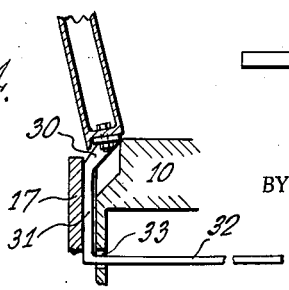
INVENTOR.
ANTON HOFACKER.
BY
ATTORNEY.

Patented Oct. 22, 1935

2,018,064

UNITED STATES PATENT OFFICE 2,018,064

FOLDING RUNNING BOARD FOR ROAD VEHICLES

Anton Hofacker, Henderson, Md.

Application March 6, 1935, Serial No. 9,556

2 Claims. (Cl. 280—166)

This invention relates to improvements in road vehicles, particularly of the automobile type, and specifically to the usual elongated steps at the sides of the vehicle, commonly known as running boards.

Such running boards, while quite convenient, even necessary, in entering or leaving an automobile, also offer an opportunity for undesirable persons with evil intent to board the automobile, intimidate the passengers, commit robbery and then drop off with little danger to themselves.

Having this matter in mind it has been an object of the invention to provide a running board with means which cause it to automatically fold upward, closely against the body of the vehicle when the doors are closed.

A further feature is in the provision of means whereby the running board may be safely and securely locked, when in a folded position, from the inside of the vehicle and remain in locked position until released.

Another purpose is to produce means for positioning the running board in normal operative position whenever the front door is opened, and Finally, a further aim is to provide means for retaining the rear door closed until the front door has been opened.

These and other important features are accomplished by the novel construction and combination of parts hereinafter described and illustrated in the accompanying drawing, constituting a material part of this disclosure, and in which:—

Figure 1 is a fragmentary side elevational view of a conventional type of automobile equipped with an embodiment of the invention.

Figure 2 is a transverse sectional view drawn to an enlarged scale and taken on line 2—2 of Figure 1.

Figure 3 is a similar sectional view taken on line 3—3 of Figure 1.

Figure 4 is another like view taken on line 4—4 of Figure 1.

Figure 5 is a fragmentary perspective view of the vehicle, showing both side doors open and the running board in operative position.

Referring in greater detail to the drawing, the body 10 of any common type of automobile is shown as complete with a motor housing 11, front wheel guard 12, and rear wheel guard 13 over the drive wheel 14.

Front doors 15 and rear doors 16 are indicated as being provided with hinges, lock handles and windows as usual.

A running board 17 is held to the chassis of the vehicle by hinges 18 in which are incorporated strong springs 19 adapted to fold the running board upwardly from its normal, operative position, in which its front end rests overlappingly on an extension 20, of the front wheel guard, and at the rear on a seat 21 extending forwardly from the rear guard 13.

In place of such seats for the ends of the running board, suitable supports may extend outwardly from the chassis to act as brackets on which the running board rests.

Bolted or otherwise securely fastened to the bottom of the front door 13 is a bar 22 having a fork in its lower, depending end in which is mounted a roll 23 in contact with the lower portion of the running board 17, and which, as the door is swung outwardly on its hinges, impinges on the board, overcoming the effect of the spring hinges and folding the board into its usual level extended operative position, as seen in Figure 5.

Obviously the relation of the bar 22 to the door hinges will be such as to allow full opening of the door when the running board becomes level and seated on the end supports 20 and 21.

Further remote from the door hinges is a lever 25 having a handle 26 accessible only from the interior of the vehicle, this lever being fixed on a spindle 27 passing through the lower portion of the door 15 and provided at its outer end with a detent 28 adapted to be swung by the lever into position to engage over the upper edge of the running board 17 and retain it in raised position.

In order to prevent the rear door 16 from opening when the running board is folded, a stop 30 is fixed on the lower edge of the door and provided with a down reaching arm 31 contactable by the board when raised, thus preventing the rear door from being opened until the board is lowered.

Extending rearwardly from the stop arm 31, under the floor of the vehicle, is a rod 32 movable in a slot 33 in the side of the vehicle, this rod, when the rear door is opened, reaching over the upper surface of the running board 17 and preventing it from folding upwardly until the rear door has been closed, irrespective of the position of the front door.

From the foregoing it will be seen that the running board of the vehicle is held in an inaccessible position, when the doors are closed and cannot be used until released from the inside of the vehicle.

It will also be apparent that the rear door can be opened after the front door, and the running board properly positioned.

It is also to be understood that opening of the front door positively positions the running board, and that it will fold upwardly when the front door is closed by reason of the spring hinges only after the rear door has been closed.

While the device has been shown as applied to one side of the vehicle, it is obvious that both sides may be semilarly provided, and also that vehicles with a single door on each side may be arranged in a similar manner; furthermore, installation of the device can be readily made on automobiles of any type with little difficulty.

Having thus described the invention and set forth the manner of its construction and application, what is claimed as new and sought to secure by Letters Patent, is:—

1. In a vehicle having a side door hinged to swing outwardly and a running board, hinges connecting the inner edge of said board to the body of the vehicle, springs associated with said hinges operative to fold said board normally upward against the vehicle body below said door, supports for said board when turned outwardly on its hinges, a lever fixed on said door, a roll carried by said lever to engage the adjacent surface of said board and adapted to move it into operative position upon opening the door, a second lever pivotally mounted in said door having a handle accessible only from the interior of the vehicle and a clamp element actuated by said second lever adapted to retain said board when folded upwardly.

2. In a road vehicle having front and rear doors foldable outwardly, a running board having spring hinges adapted to fold the board upon its inner edge upwardly against the body of the vehicle, means for supporting said board when in a level horizontal position, a lever carried roll fixed on said front door adapted to fold said board outwardly upon opening said front door, a second lever pivoted in said front door and having a part adapted to clamp said board when in a raised position, and a bar fixed on the bottom edge of said rear door to contact said board when in a raised position, said bar being operative to retain said rear door closed until said board is in operative position.

ANTON HOFACKER.